Sept. 2, 1958 R. PFISTERER 2,849,854
ELASTIC POINT-SUSPENSION OF WATCH-WORKS IN WATCH-CASES
Filed Aug. 17, 1954 4 Sheets-Sheet 1

INVENTOR:
RICHARD PFISTERER
BY Toulmin & Toulmin
ATTORNEYS

Sept. 2, 1958 R. PFISTERER 2,849,854
ELASTIC POINT-SUSPENSION OF WATCH-WORKS IN WATCH-CASES
Filed Aug. 17, 1954 4 Sheets-Sheet 2
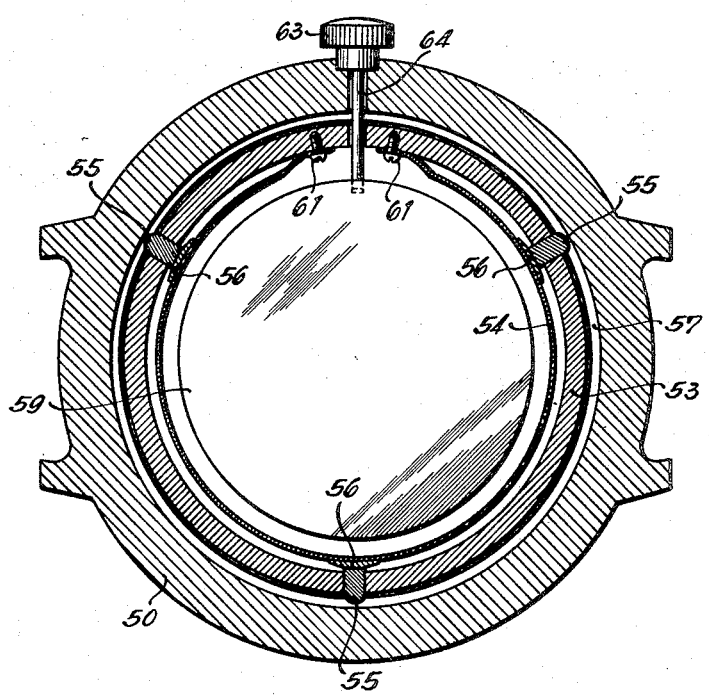
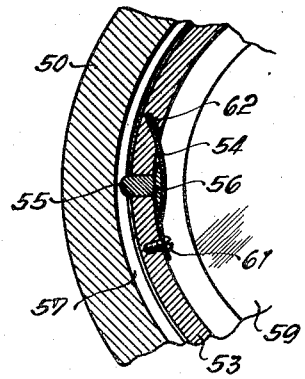
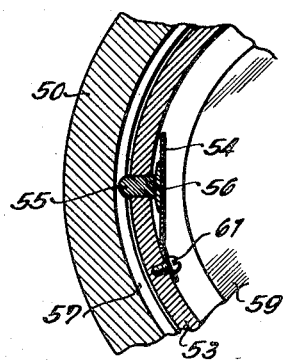
INVENTOR
RICHARD PFISTERER
BY Toulmin & Toulmin
ATTORNEYS

INVENTOR
RICHARD PFISTERER

ATTORNEYS

Sept. 2, 1958 R. PFISTERER 2,849,854
ELASTIC POINT-SUSPENSION OF WATCH-WORKS IN WATCH-CASES
Filed Aug. 17, 1954 4 Sheets-Sheet 4

INVENTOR
RICHARD PFISTERER
BY Toulmin & Toulmin
ATTORNEYS

United States Patent Office 2,849,854
Patented Sept. 2, 1958

2,849,854

ELASTIC POINT-SUSPENSION OF WATCH-WORKS IN WATCH-CASES

Richard Pfisterer, Pforzheim, Germany

Application August 17, 1954, Serial No. 450,345

Claims priority, application Germany August 19, 1953

12 Claims. (Cl. 58—88)

The present invention relates to elastic point-suspension of watch-works in watch-cases, which can be used in circular and non-circular (for example rectangular) watch-cases and watch-work supporting rings or frames, as well as to a crown for wrist-watches and pocket-watches which are provided with an elastically suspended watch-work.

It is already known to the art to render not only parts of watch-works of wrist-watches and pocket-watches less vulnerable to shocks through their elastic suspension in the watch-case, but also to elastically suspend the entire watch-work in the appertaining watch-case. It is further already known to limit the suspension to a number of points, for example at least three points for circular watches.

However, known suspending systems of this kind either do not protect the watch-work against shocks in every direction, but only against shocks in either vertical or radial direction; or, the suspending means of these known systems are so voluminous that they are unsuited for use in wrist-watches.

These disadvantages of known suspending means are overcome by the herein disclosed point-suspension with the aid of a plurality of spherical or conical bodies which are pressed, preferably by means of one single band-spring for all of the bodies, into either one common recess for all of the bodies, or into a special recess for each of the bodies, whereby the aforesaid band-spring embraces the watch-work, and whereby the radius of curvature of the common recess or the special recesses is large as compared with that of the aforesaid bodies.

According to the invention the common recess may consist of a circular groove provided in the interior of the watch-case, or of sections of a circular groove, or there may be a special cavity for each of the spherical or conical bodies, whereby the cavity corresponds in shape to the rounded or conical surface of the body, and whereby, particularly if the watch-work and its supporting or suspending ring are of circular formation, a turning of the ring in axial direction is prevented through the resistance offered to the turning by the sloping walls of the groove or cavities. This also prevents the watch-work supporting ring from hitting against the winding shaft extending through the ring through a lateral opening in the ring.

The common band-spring for all of the spherical or conical bodies is fastened to the watch-work supporting ring preferably at only two places adjajcent the place where the winding shaft extends through the ring. The spherical or conical bodies have the shape of bolt-ends provided with a rounded or conical front surface and rest with their base against the band-spring, the contact-surface of the base being preferably curved in conformity with the curvature of the spring.

The band-spring, with the bolt-ends resting against it and sliding on it, is preferably arranged within the watch-work supporting ring, through which the bolt-ends extend.

It is further possible to devise the construction in such a way that every bolt-end rests against or is supported by a special band-spring provided in the interior of the watch-work supporting ring.

It will suffice when these special band-springs have only one of their ends fastened to the watch-work supporting ring, for example by means of a screw, while the other end of the band-spring may loosely engage in a recess or opening of the watch-work supporting ring and slide in that recess or opening whenever the pressure against the spring changes.

It is understood that the point-suspension system for watch-works as disclosed in the present invention can not only be applied to circular watch-works, but also to watch-cases provided with a non-circular, oval, rectangular interior or watch-work supporting ring. In case of an angular interior and watch-work supporting ring, the openings for the bolt-ends are provided in either the straight-lined sides or in the corners of the supporting ring.

The watch-work, which also carries the dial-plate, is rigidly secured to the watch-work supporting ring, for example by means of screws.

The vibrations of the watch-work supporting ring in vertical direction are limited by a projecting portion of a packing ring interposed between the watch-case and the bottom of the latter, and by a projecting portion of the watch-case positioned between marginal portions of the dial-plate and the watch-glass.

From the watch-work supporting ring, which otherwise is entirely freely positioned with the watch-work and dial-plate within the watch-case, project laterally only the spherical or conical front surfaces of the bolt-ends. This permits a compact construction and renders it possible that the diameter of the watch does not considerably exceed in length the diameter of a watch which is not provided with an elastically suspended watch-work. Nevertheless, the elastic suspension is fully effective for shocks in radial as well as in vertical direction.

However, this elastic suspension of the watch-work can not be effective if, at the same time, the watch-work is rigidly connected to the watch-case by means of the winding-shaft and crown assembly. For, the shoulder of the crown embracing the tube of the winding-shaft renders the crown practically immovable with respect to the watch-case, so that movements of the watch-work with respect to the watch-case act as a strain on the winding-shaft.

On the other hand, there is a strain on the winding-shaft frequently also in watches which have their watch-work rigidly secured in the watch-case, because of the tolerances between the bore in the watch-case and the opening for the winding-shaft in the watch-work.

It is already known to avoid the strain on the winding shaft through the provision of a coupling part between the crown and the undivided winding-shaft, whereby the coupling part (which is rigidly connected to the winding-shaft) nutatably rests against a spring. But crowns of this known type are not watertight, and can not be made watertight without serious disadvantages.

Contrary to this, the crown which the invention proposes to employ is so devised that the spring presses the coupling part (which is rigidly secured to the winding-shaft) onto the packing of the crown and thereby renders the crown watertight.

For this purpose, the coupling part (which is rigidly secured to the winding-shaft) is provided with a projecting rounded portion which rests in point-like fashion against a spring-plate or rubber-plate supported in the crown only with marginal portions. In this way an always uniform all-round pressure is exerted on the packing. The pressure upon the packing is preferably exerted by a flange pressed by the spring down upon the shoulder of the crown which, according to the invention, is formed by a packing ring secured in its position within the crown by an outer metal ring.

Additional features and advantages of the invention will be understood from a consideration of the following detailed description taken in connection with the accompanying drawings, forming a part of this specification and in which several embodiments of the invention have been shown by way of example. However, I wish to say that the invention is not confined to any strict conformity with the showing of the drawings, but may be changed or modified, so long as such changes or modifications mark no material departure from the salient features of the invention as expressed in the appended claims.

In the drawings:

Fig. 5 is a sectional view of a watch provided with only one band-spring;

Figs. 6 and 7 are fractional sectional views of modified forms of construction provided with a special spring for every bolt-end;

Figure 1:
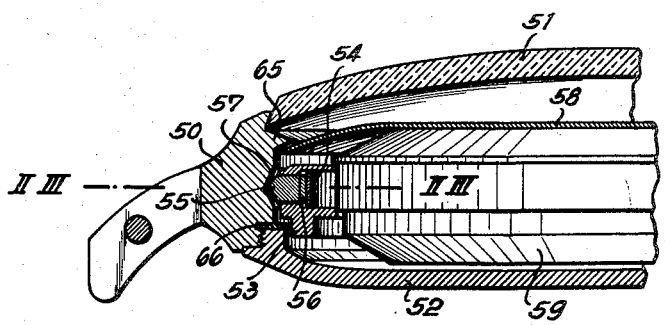
Fig. 1 is a fractional sectional view of a watch provided with elastically suspended watch-work, on line I—I of Figs. 2 and 3.

Referring now to the drawings in detail, the reference numeral 50 designates the watch-case provided in customary manner with the watch-glass 51 and bottom 52. Positioned within the annular supporting ring or rim 53 for the watch-work is the band-spring 54, against which rest with their base 56 (see Fig. 5) at least three bolt-ends 55. The dial-plate is denoted by 58.

The watch-case 50 is provided on its inside with a wide-open annular groove 57. But it is also possible to omit the annular groove 57 and to provide the watch-case for every bolt-end 55 with a special recess or cavity 60, in order to prevent turning movements in axial direction, particularly when the interior of the watch-case is of circular formation (see Fig. 3). The bolt-ends 55 project through the annular supporting rim 53 and are slidingly guided in the latter, and in case of shocks in radial direction the bolt-ends are simply radially displaced in inward direction against the action of the spring 54. In case of shocks in vertical direction, and in the form of construction of Fig. 3 also in tangential direction, the spherical head of the bolt 55 moves up the slope of the groove or recess and is thus likewise radially displaced in inward direction against action of the spring 54 in the same way as has already been described for shocks in radial direction. It will be seen, therefore, that the suspending means of the invention protect the watch-work against shocks in every direction, although they take up only a minimum of space.

The band-spring 54 for all of the bolts 55 is fastened only at two places, adjacent the passage for the winding-shaft, to the supporting rim 53 by means of screws 61 (see Fig. 5).

If every bolt 55 is provided with an own spring 54 (as shown in Figs. 6 to 9), the spring is secured at one end in its position by a screw 61, while the other end of the spring remains unfastened (Fig. 7), or loosely engages in an opening 62 (Fig. 6) of the supporting-rim 53, so that it can slide in that opening whenever the pressure changes. It is understood that the arrangement can also be such that both ends of the spring 54 slidingly engage in openings 62 (see Figs. 8 and 9).

Figures 2, 4:
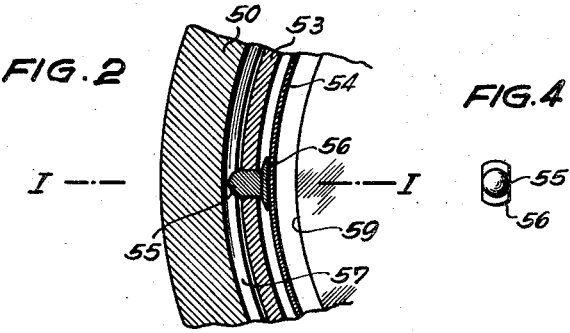
Fig. 2 is a fractional sectional view of the watch-case and suspending means, on line II—II of Fig. 1.
Fig. 4 is a top-view of a bolt-end.
Figure 3:
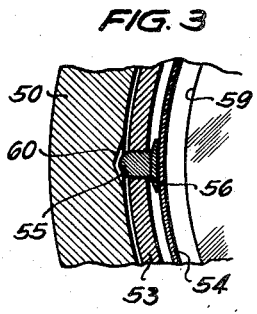
Fig. 3 is a fractional sectional view of the watch-case and suspending means, on line III—III of Fig. 1.
Figure 8:
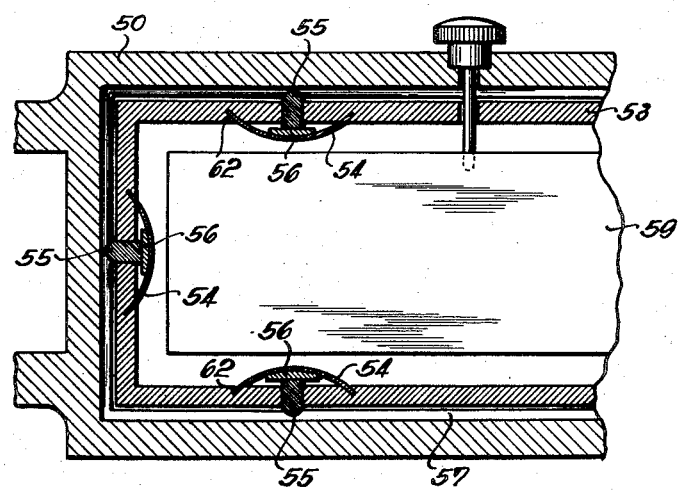
Figs. 8 and 9 are fractional sectional views of rectangular watch-cases and supporting frames provided with a special spring for every bolt-end.

The base 56 of the bolts 55 should preferably be curved in conformity with the curvature of the appertaining spring, that is to say, either inwardly (as shown in Figs. 2, 3 and 5) or outwardly (as shown in Figs. 6 and 8).

Figure 9:
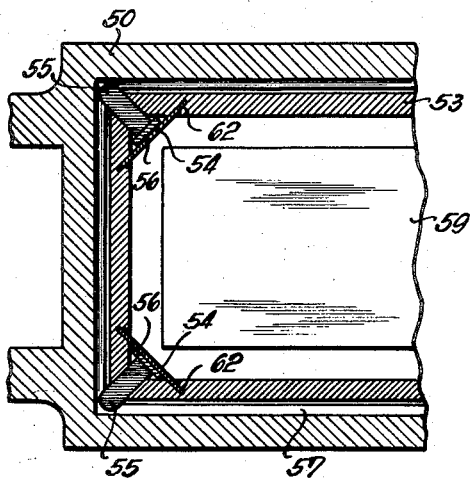

If the watch-case 50 and supporting-rim 53 are of angular shape (see Figs. 8 and 9), the openings for the bolts 55 are provided either in the straight-lined portions of the supporting-rim 53 (Fig. 8), or in the corners of the latter (Fig. 9).

The vibrations of the supporting-rim 53 in vertical direction are limited by the stop afforded by the projecting portion of the packing ring 66 interposed between the watch-case 50 and the bottom 52 and by the projecting portion 65 of the watch-case 50 positioned between marginal portions of the dial-plate 58 and the watch-glass 51.

Figure 10:
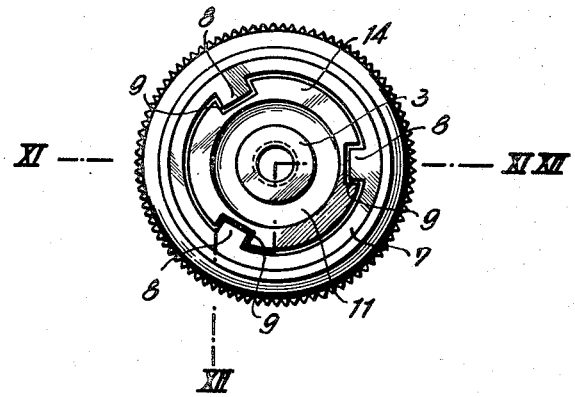
Fig. 10 is a bottom-view of the crown of a watertight watch seen in the direction of the arrow of Fig. 11.
Figure 11:
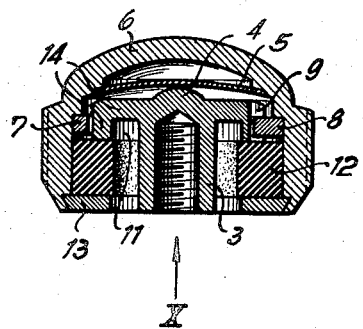
Fig. 11 is a central vertical section of the crown on line XI—XI of Fig. 10.
Figure 12:
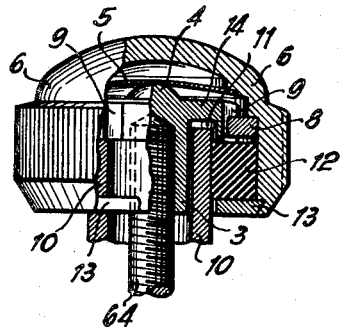
Fig. 12 is a side-view, partly in section, of the crown mounted on the tube, on line XII—XII of Fig. 10.

Screwed onto the winding-shaft 64 (Fig. 12) is the coupling 3. The coupling 3 has a flange 14 and a rounded portion 4 by means of which it is enabled to nutate or reel on the spring plate 5 positioned above it in the crown 6. The spring-plate 5 is pretensioned and urges the flange 14 of the coupling 3 against the shoulder or collar 12 of the crown 6. Arranged in the crown 6 beneath the spring-plate 5 is the ring 7 provided with drivers 8 (see Fig. 19). To these drivers 8 correspond notches 9 provided in the flange 14 of the coupling 3. There is so much clearance between the notches 9 and the drivers 8 (see Fig. 10) that the movability of the coupling with respect to the spring-plate 5 is not interfered with. The tube 10 of the watch extends into the gap 11 between the coupling and crown (see Fig. 12). The annular shoulder or collar 12 consists in the embodiment illustrated in the drawings of elastic material (rubber). It simultaneously serves as packing ring, and is secured in its position in the crown by means of the ring 13.

What I claim as new and desire to secure by Letters Patent of the United States is:

1. In a watertight watch, particularly of the wristwatch type, provided with elastic point-suspending means for the watch-work, the improvement comprising, in combination, a watch-work; a supporting frame provided with a plurality of perforations, said frame surrounding said watch-work and being rigidly connected thereto; spring means of the band-spring type arranged within said supporting frame; a plurality of bolt-like members provided with a rounded front end and an enlarged base slidingly arranged within said perforations of said supporting frame and loosely resting with said enlarged base against said spring means and projecting with said rounded front end from said supporting frame in outward direction; and a watch-case loosely surrounding with play said supporting frame and provided in its inner surface facing said projecting rounded front ends of said bolt-like members with at least one recess suitably shaped for said rounded bolt-ends to slidingly engage in the same so as to elastically support said supporting ring and said watch-work within said watch-case.

2. A wrist-watch as per claim 1, in which said rounded front ends of said bolt-like members are of spherical formation.

3. A wrist-watch as per claim 1, in which said watch-work and said supporting frame therefor are of circular formation; and in which said spring means consist of a substantially circular band-spring against which all of said plurality of bolt-like members rest with their enlarged base.

4. A wrist-watch as per claim 1, in which said recessed portion in the inner surface of said watch-case is a groove surrounding said supporting frame for all of the rounded front ends of said bolt-like members to slidingly engage in.

5. A wrist-watch as per claim 1, in which said watch-work and said supporting frame therefor are of circular formation; and in which said watch-case is provided with a special recess for every bolt-like member, said recesses being provided with sloping walls of such formation that turning of the supporting frame in axial direction is prevented through the braking contact exerted by said sloping walls upon said bolt-like members.

6. A wrist-watch as per claim 1, in which said watch-work and said supporting frame therefor are of circular formation; and in which said spring means consist of a substantially circular band-spring against which all of said plurality of bolt-like members rest with their enlarged base, said band-spring being fastened to said supporting frame only at two places.

7. A wrist-watch as per claim 1, in which said spring-means of the band-spring type are of curved formation; and in which the formation of the enlarged base of said bolt-like members corresponds to the curvature of said spring-means.

8. A wrist-watch as per claim 1, in which said spring-means consist of a plurality of band-springs; and in which each of said plurality of bolt-like members rests with its enlarged base against one of said plurality of band-springs.

9. A wrist-watch as per claim 1, in which said spring-means consist of a plurality of band-springs fastened at one end to said supporting frame; and in which each of said plurality of bolt-like members rests with its enlarged base against one of said plurality of band-springs.

10. A wrist-watch as per claim 1, in which said spring-means consist of a special band-spring for each of said plurality of bolt-like members slidingly secured at least at one end in an opening of said supporting frame, so that pressure exerted by the enlarged base of said bolt-like member against the band-spring results in sliding displacement of the spring-end within said opening of the supporting frame.

11. A wrist-watch as per claim 1, in which said watch-case and said supporting frame are of angular formation; and in which said perforations in said supporting frame for said plurality of bolt-like members are provided in the corners of said angular supporting frame.

12. A wrist-watch as per claim 1, including a packing ring interposed between said watch-case and its bottom in such manner that a portion of the packing ring projects from the watch-case in inward direction below said recess in the inner surface of the watch-case; and in which said watch-case is further provided with an inwardly projecting portion above said recess in its inner surface; and in which said supporting frame is elastically supported by means of the rounded front ends of said bolt-like members in said recess of said watch-case in such manner that vibrations of said supporting frame in axial direction are limited by said projecting portion of said packing-ring and by said projecting portion of said watch-case.

References Cited in the file of this patent

UNITED STATES PATENTS

| | | |
|---|---|---|
| 1,995,951 | Straumann | Mar. 26, 1935 |
| 2,044,752 | Dunlap | June 16, 1936 |
| 2,202,114 | Morf | May 28, 1940 |
| 2,284,594 | Schmitz | May 26, 1942 |

FOREIGN PATENTS

| | | |
|---|---|---|
| 1,029,191 | France | Mar. 4, 1953 |